US012546012B2

(12) United States Patent
Sengoku et al.

(10) Patent No.: US 12,546,012 B2
(45) Date of Patent: Feb. 10, 2026

(54) ZN-PLATED HOT STAMPED PRODUCT

(71) Applicant: NIPPON STEEL CORPORATION, Tokyo (JP)

(72) Inventors: Akihiro Sengoku, Tokyo (JP); Kojiro Akiba, Tokyo (JP); Hiroshi Takebayashi, Tokyo (JP); Toshiki Nonaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 544 days.

(21) Appl. No.: 18/010,883

(22) PCT Filed: Oct. 30, 2020

(86) PCT No.: PCT/JP2020/040848

§ 371 (c)(1),
(2) Date: Dec. 16, 2022

(87) PCT Pub. No.: WO2022/091351

PCT Pub. Date: May 5, 2022

(65) Prior Publication Data

US 2023/0220557 A1 Jul. 13, 2023

(51) Int. Cl.

*C23C 28/00* (2006.01)
*B32B 15/01* (2006.01)
(Continued)

(52) U.S. Cl.

CPC ........ *C23C 28/3225* (2013.01); *B32B 15/013* (2013.01); *C23C 2/26* (2013.01); *C23C 2/28* (2013.01); *C23C 28/345* (2013.01)

(58) Field of Classification Search

CPC ......... C23C 28/3225; C23C 2/26; C23C 2/28; C23C 28/345; C23C 38/02; C23C 38/04;
(Continued)

(56) References Cited

U.S. PATENT DOCUMENTS 9,932,652 B2 * 4/2018 Sengoku .................. C21D 9/46
2013/0004881 A1 * 1/2013 Shaigan .................. C25D 5/12
429/465

(Continued)

FOREIGN PATENT DOCUMENTS

CN 106133153 A 11/2016
EP 1 439 240 A1 7/2004
JP 3582511 B2 10/2004

*Primary Examiner* — Kevin R Kruer
(74) *Attorney, Agent, or Firm* — Birch, Stewart, Kolasch & Birch, LLP

(57) ABSTRACT

This Zn-plated hot stamped product includes a steel, a Zn-based plating layer, and an oxide layer, in which an upper layer which is a region on a surface side of the Zn-based plating layer has a two-phase structure of a Γ phase and an Fe—Zn solid solution, and a lower layer which is a region of the Zn-based plating layer excluding the upper layer has a single-phase structure of an Fe—Zn solid solution, an upper layer thickness and a lower layer thickness satisfy the following expression, a Mn content ratio of Max. Mn/Min. Mn, which is a ratio of a maximum value Max. Mn to a minimum value Min. Mn of an Mn content on a surface of the Zn-plated hot stamped product, is 10.0 or less, and an average value Ave. Mn is 0.5 to 7.5% by mass %.

$$0.20 \leq \text{upper layer thickness}/(\text{upper layer thickness} + \text{lower layer thickness}) \leq 0.80$$

8 Claims, 3 Drawing Sheets

(51) Int. Cl.
*C23C 2/26* (2006.01)
*C23C 2/28* (2006.01)

(58) Field of Classification Search
CPC .. C23C 2/06; C23C 2/285; C23C 2/29; C23C 2/40; C23C 38/58; B32B 15/013; C21D 9/46
See application file for complete search history.

(56) References Cited

U.S. PATENT DOCUMENTS

| | | | | |
|---|---|---|---|---|
| 2015/0073147 | A1* | 3/2015 | Inoue | H10K 85/6572<br>549/43 |
| 2015/0179940 | A1* | 6/2015 | Mujica-Fernaud | C09K 11/06<br>548/440 |
| 2015/0287921 | A1* | 10/2015 | Kato | C07D 405/12<br>548/440 |
| 2016/0215360 | A1* | 7/2016 | Köyer | C21D 9/46 |
| 2016/0276604 | A1* | 9/2016 | Kwong | H10K 85/6572 |
| 2017/0145532 | A1* | 5/2017 | Sengoku | C22C 38/26 |
| 2017/0213988 | A1* | 7/2017 | Park | C09K 11/025 |
| 2018/0287062 | A1* | 10/2018 | Itoi | C07D 333/76 |
| 2018/0358562 | A1* | 12/2018 | Takita | H05B 47/11 |
| 2019/0051844 | A1* | 2/2019 | Ji | C09K 11/06 |
| 2022/0025508 | A1* | 1/2022 | Kwak | C23C 14/16 |
| 2022/0064179 | A1* | 3/2022 | Jun | C07D 495/00 |
| 2023/0041452 | A1* | 2/2023 | Sengoku | C23C 2/06 |
| 2023/0079854 | A1* | 3/2023 | Kikuchi | C22C 38/04<br>148/533 |
| 2023/0095166 | A1* | 3/2023 | Sato | C23C 30/005<br>148/534 |
| 2023/0220557 | A1* | 7/2023 | Sengoku | C23C 2/26 |
| 2024/0227354 | A1* | 7/2024 | Mitsunobu | C23C 30/00 |

* cited by examiner

ZN-PLATED HOT STAMPED PRODUCT

TECHNICAL FIELD

The present invention relates to a Zn-plated hot stamped product.

BACKGROUND ART

In the field of automobile members, there is a growing need for higher strength for the purpose of improving fuel efficiency and collision safety, and application of a hot stamping technology is expanding as a solution to the problem. Hot stamping is a technology for manufacturing a high-strength press-formed product having high shape fixability by quenching (hardening) in which heat removal from the die is utilized at the same time as hot forming when a blank heated to a temperature of an austenite single-phase region ($Ac_3$ point) or higher, for example, about 900° C., is press processed.

Also, since scale such as iron oxide is generated during heating of hot stamping, it is necessary to remove the scale by shot blasting or the like after hot stamping, but as described in Patent Document 1, since use of a plated steel sheet suppresses generation of scale, making it possible to omit the scale removal process, application of a Zn-based plated steel sheet for hot stamping is expanding.

When a Zn-based plated steel sheet is used, a Zn component remains in a surface layer of the steel sheet after hot stamping, and therefore an effect of improving corrosion resistance can also be obtained compared to a hot stamping material of a non-plated steel sheet. In recent years, there has also been a need to apply hot stamping materials to members that require high rust resistance, and further improvement in corrosion resistance of hot stamped products is desired.

Also, so far, hot stamping materials have mainly been used as reinforcing materials for frame members and were used at positions that cannot be seen from the outside after they were installed in automobiles, but in the future, it is also desired to expand the application to positions that are visually noticeable by improving the quality of appearance after hot stamping. However, conventionally, when a hot-dip galvanized steel sheet is used for hot stamping, a pattern like a tortoise shell or a spider's web (a so-called hexagonal pattern) is generated on the surface, and this has been required to be suppressed.

Incidentally, in a Zn-plated hot stamped product having a F phase and an Fe—Zn solid solution, the F phase contains about 70 to 85% by mass of Zn and about 15 to 30% by mass of Fe, and the Fe—Zn solid solution contains 10 to 40% by mass of Zn and 60 to 90% by mass of Fe.

CITATION LIST

Patent Document

[Patent Document 1]
Japanese Patent No. 3582511

SUMMARY OF THE INVENTION

Problems to be Solved by the Invention

Both the Γ phase and the Fe—Zn solid solution are not excellent in both sacrificial corrosion resistance and plating adhesion. Also, a configuration having both corrosion resistance and adhesion to a steel sheet, which is a steel, is not known.

The present invention has been made in view of the above circumstances, and an objective of the present invention is to provide a Zn-plated hot stamped product that can secure plating adhesion to a steel and corrosion resistance and is excellent in appearance.

Means for Solving the Problem

The present inventors have found that a hexagonal pattern is formed by local oxidation of Mn, and it is important to control a formation state of an oxide film formed on an outermost surface layer during heating of hot stamping, and a change in volume and a flow due to a change in plating phase under the oxide. Also, the present inventors have found that when a ratio between an upper layer thickness and a lower layer thickness of a plating layer, in which the upper layer has a Γ phase and an Fe—Zn solid solution and the lower layer has an Fe—Zn solid solution, is controlled to be within a specific range, both excellent corrosion resistance after coating and excellent plating adhesion can be achieved.

The present invention has been made through further studies on the basis of the above findings, and the gist thereof is as follows.

(1) A Zn-plated hot stamped product according to one aspect of the present invention includes a steel, a Zn-based plating layer containing Zn formed on a surface of the steel, and an oxide layer containing Zn and Mn formed on a surface of the Zn-based plating layer, in which an upper layer which is a region on the surface side of the Zn-based plating layer has a two-phase structure of a Γ phase and an Fe—Zn solid solution, and a lower layer which is a region of the Zn-based plating layer excluding the upper layer has a single-phase structure of an Fe—Zn solid solution, an upper layer thickness and a lower layer thickness satisfy the following expression (1), and a maximum value Max. Mn, a minimum value Min. Mn, and an average value Ave. M of an Mn content by mass % on a surface of the Zn-plated hot stamped product satisfy the following expressions (2) and (3).

$$0.20 \leq \text{upper layer thickness}/(\text{upper layer thickness} + \text{lower layer thickness}) \leq 0.80 \quad (1)$$

$$\text{Ave. Mn} = 0.5 \text{ to } 7.5 \quad (2)$$

$$\text{Max. Mn}/\text{Min. Mn} \leq 10.0 \quad (3)$$

(2) In the Zn-plated hot stamped product according to the above-described (1), a proportion of the Γ phase in the two-phase structure of the Γ phase and the Fe—Zn solid solution of the upper layer may be 20 to 80%.

(3) In the Zn-plated hot stamped product according to the above-described (1) or (2), a Zn content of the Zn-based plating layer may be 30.0% or more by mass %.

(4) In the Zn-plated hot stamped product according to any one of the above-described (1) to (3), a sheet thickness may be 1.0 to 3.2 mm.

Effects of the Invention

According to the above-described aspects, it is possible to provide a Zn-plated hot stamped product that can secure plating adhesion to a steel and corrosion resistance, and is excellent in appearance.

EMBODIMENT FOR IMPLEMENTING THE INVENTION

The present inventors have postulated that presence of a Γ phase is important for improving corrosion resistance after coating because the T phase has a high Zn concentration and high sacrificial corrosion resistance, but the Γ phase is hard and brittle because it is an intermetallic compound. On the other hand, an Fe—Zn solid solution has been thought to have high plastic deformability because it is a metal in which Zn is dissolved in a ferrite. Therefore, presence of the Fe—Zn solid solution has been thought to be important from the perspective of plating adhesion. On the basis of this idea, as a result of intensive studies on reduction of a hexagonal pattern, the present inventors have found that the hexagonal pattern is formed by local oxidation of Mn diffusing from an underlying steel to a surface of a hot stamped product by hot stamping, and have found that it is important to control a formation state of an oxide film formed on an outermost surface layer during heating of the hot stamping, and a change in volume and a flow due to a change in plating phase under the oxide.

Specifically, when Al contained in plating is oxidized as the plating melts at an initial stage of heating of the hot stamping, Zn oxide and Mn oxide are generated mainly after an Al oxide layer is formed on an outermost surface layer with a thickness of tens of nanometers, but it has been found that, when the Mn oxide is locally generated at a place in which the Al oxide layer is destroyed, it is visually recognized as a hexagonal pattern. On the basis of the above, as a result of intensive studies on a method for suppressing the hexagonal pattern, it has been found that, if a Mn content ratio (Max. Mn/Min. Mn), which is a ratio of a maximum value Max. Mn to a minimum value Min. Mn of a Mn content on a surface of the Zn-plated hot stamped product, is a specific value or less, and an average value Ave. Mn of the Mn content of the above-described product is within a specific range, formation of the oxide layer and a reaction of the plating layer can proceed uniformly, generation of the hexagonal pattern can be suppressed, and a satisfactory appearance can be obtained.

Also, the present inventors have found that when a ratio between an upper layer thickness and a lower layer thickness of a plating layer, in which the upper layer has a r phase and an Fe—Zn solid solution and the lower layer has an Fe—Zn solid solution, is controlled to be within a specific range, both excellent corrosion resistance after coating and excellent plating adhesion can be achieved. The present invention was completed on the basis of the above-described findings.

Figure 1:
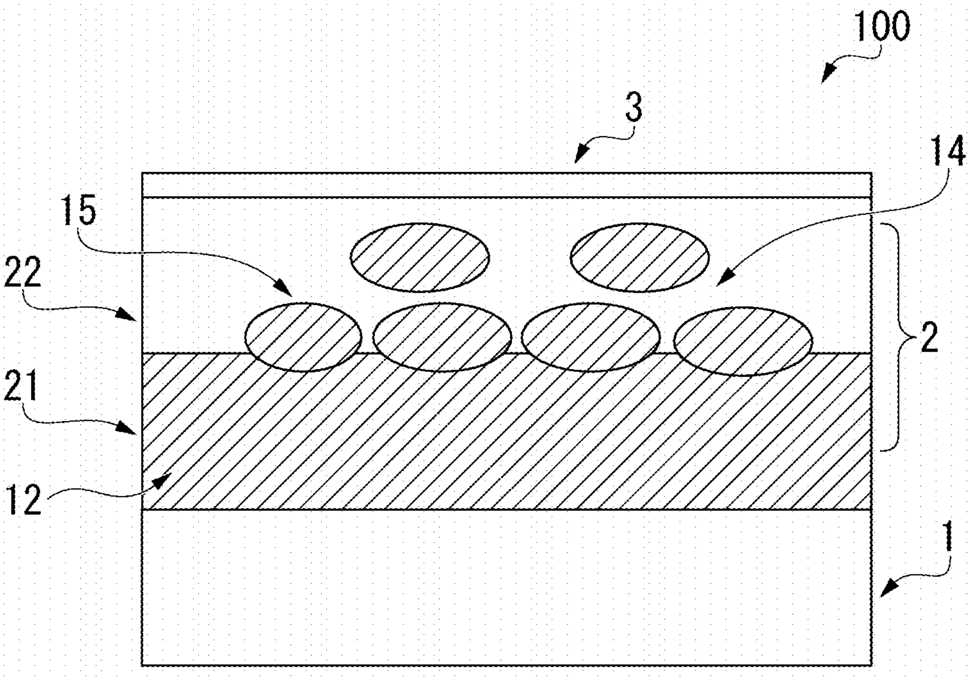
FIG. 1 is a schematic cross-sectional view of a Zn-plated hot stamped product according to the present embodiment.

A Zn-plated hot stamped product 100 according to the present embodiment will be described with reference to FIG. 1. The Zn-plated hot stamped product 100 according to the present embodiment includes steel 1, a Zn-based plating layer 2, and an oxide layer 3. The Zn-based plating layer 2 includes a lower layer 21 and an upper layer 22. The upper layer 22, which is a region of the Zn-based plating layer 2 on a surface layer side, has a two-phase structure in which an Fe—Zn solid solution 15 is distributed in a Γ phase (capital gamma phase) 14 in an island shape. The lower layer 21, which is a region of the Zn-based plating layer 2 on the steel side, has a single-phase structure of the Fe—Zn solid solution. Hereinafter, each configuration will be described. Further, a thickness of the Zn-based plating layer 2 is about several to tens of micrometers. On the other hand, a thickness of the oxide layer 3 is mostly about hundreds of nanometers to several micrometers and is smaller than the thickness of the Zn-based plating layer 2. However, FIG. 1 is a view in which the thickness of the oxide layer 3 is enlarged for convenience of illustration.

(Steel)

The steel 1 will be described. A chemical composition of the steel 1 does not need to be particularly limited, but as an example of the chemical composition of the steel for a steel sheet of automobiles, for example, by mass %, 0.05% to 0.45% of C, 0.50% or less of Si, 0.50 to 2.50% of Mn, 0.030% or less of P, 0.015% or less of S, 0.100% or less of Al, 0.010% or less of N, 0 to 1.00% of Cu, 0 to 1.00% of Ni, 0 to 0.50% of Cr, 0 to 0.50% of Mo, 0 to 0.10% of Nb, 0 to 0.10% of V, 0 to 0.10% of Ti, 0 to 0.0050% of B, 0 to 0.0100% of Ca, 0 to 0.0100% of REM, and a balance being Fe and impurities can be mentioned. Hereinafter, the chemical composition of these elements will be described.

"C: 0.05% to 0.45%"

Carbon (C) is an element that enhances a strength of the Zn-plated hot stamped product after hot stamping. If a C content in the steel 1 is too low, the above-described effect cannot be obtained. Therefore, a lower limit of the C content in the steel 1 is preferably set to 0.05%. A preferable lower limit for the C content is 0.10% or 0.15%. On the other hand, if the C content in the steel 1 is too high, toughness of the steel sheet deteriorates. Therefore, an upper limit of the C content is preferably set to 0.45%. A preferable upper limit of the C content is 0.40% or 0.35%.

"Si: 0.50% or Less" Silicon (Si) is an element that is inevitably contained in the steel 1. Also, Si has an effect of deoxidizing the steel 1. However, if the Si content in the steel 1 is too high, Si in the steel 1 diffuses during heating in hot stamping and forms an oxide on a surface of the steel 1. This oxide reduces phosphating properties. Si also has an action of raising an $Ac_3$ point of the steel 1, and if the $Ac_3$ point rises, a heating temperature during hot stamping may exceed an evaporation temperature of Zn. When the Si content of the steel 1 is more than 0.50%, the above-described problem becomes significant, and thus an upper limit of the Si content is preferably set to 0.50%. A more preferable upper limit of the Si content is 0.40% or 0.30%. Although it is not particularly necessary to define a lower limit of the Si content, the lower limit may be set to 0.05% for sufficient deoxidation.

"Mn: 0.50% to 2.50%"

Manganese (Mn) is an element that enhances hardenability of the steel 1, thereby enhancing a strength of the Zn-plated hot stamped product 100. If an Mn content is too low, an effect thereof cannot be obtained. When the effect is obtained, a lower limit of the Mn content of the steel 1 is preferably set to 0.50%. A preferable lower limit of the Mn content of the steel 1 is 0.60% or 0.80%. On the other hand, if the Mn content is too high, the effect is saturated. Therefore, an upper limit of the Mn content of the steel 1 is preferably set to 2.50%. A preferable upper limit of the Mn content of the steel 1 is 2.30% or 2.00%.

"P: 0.030% or Less"

Phosphorus (P) is an impurity contained in the steel 1. P segregates at grain boundaries of the steel 1 to deteriorate toughness of the steel, thereby deteriorating delayed fracture resistance. Therefore, the P content of the steel 1 is preferably as low as possible, but when the P content is more than 0.030%, an effect thereof becomes significant. Therefore, an upper limit of the P content in the steel 1 may be set to 0.030%. A lower limit of the P content is 0%.

"S: 0.015% or Less"

Sulfur (S) is an impurity contained in the steel 1. S forms sulfides to deteriorate toughness of the steel, thereby deteriorating delayed fracture resistance. Therefore, an upper limit of the S content is 0.015%. The S content is preferably as low as possible. A lower limit of the S content is 0%.

"Al: 0.100% or Less"

Aluminum (Al) is an effective element for deoxidizing steel. Although it is not particularly necessary to define a lower limit of an Al content and the lower limit is 0%, the Al content of the steel 1 may be 0.005% or more or 0.010% or more for deoxidation. On the other hand, if the Al content is too high, an $Ac_3$ point of the steel sheet rises, and a required heating temperature during hot stamping may exceed an evaporation temperature of the Zn-based plating layer 2. Therefore, an upper limit of the Al content of the steel 1 is preferably set to 0.100%. A more preferable upper limit of the Al content of the steel 1 is 0.070% or 0.050%. The Al content in the present specification means a so-called total Al (T-Al) content.

"N: 0.010% or Less"

Nitrogen (N) is an impurity that is inevitably contained in the steel 1. N is an element that forms nitrides to deteriorate toughness of the steel 1. If B is contained, N has an effect of reducing an amount of solid solution B by combining with B. When the amount of the solid solution B is reduced, hardenability deteriorates. Therefore, an N content of the steel 1 is preferably as low as possible. When the N content of the steel 1 is more than 0.010%, an effect thereof becomes significant, and thus an upper limit of the N content of the steel 1 may be set to 0.010%. It is not particularly necessary to define a lower limit of the N content, and the lower limit of the N content is 0%.

The chemical composition of the steel 1 of the present embodiment may have a chemical composition including, for example, the above-described elements and a balance of Fe and impurities. In the present specification, the "impurities" are exemplified by elements mixed in from ores and scrap as raw materials, manufacturing environments, and the like when steels are industrially manufactured, or elements that are intentionally added and allowable within a range not impairing characteristics of the Zn-plated hot stamped product 100 according to the present embodiment.

The steel 1 constituting the Zn-plated hot stamped product 100 according to the present embodiment may contain one or more selected from Cu, Ni, Cr, Mo, Nb, V, Ti, B, Ca, and REM instead of a part of Fe. The following elements are optional elements. Lower limits of amounts of those elements are 0%.

[Cu: 0 to 1.00%]

Cu is an element that can be dissolved in a steel and enhance a strength without impairing toughness. However, if a content thereof is excessive, fine cracks may occur on the surface during rolling or the like. Therefore, a Cu content is preferably 1.00% or less or 0.60% or less, and more preferably 0.40% or less or 0.25% or less. In order to sufficiently obtain the above-described effect, the Cu content is preferably 0.01% or more, and more preferably 0.05% or more.

"Ni: 0% to 1.00%"

Nickel (Ni) enhances toughness of the steel 1. Also, Ni suppresses embrittlement due to Zn of liquid phase during heating in hot stamping. When these effects are obtained, a preferable lower limit of a Ni content of the steel 1 is 0.10%. However, if the Ni content of the steel 1 is too high, the above-described effects are saturated. Therefore, an upper limit of the Ni content is preferably set to 1.00%.

"Cr: 0% to 0.50%"

Chromium (Cr) is an element that enhances hardenability of a steel. When this effect is obtained, a preferable lower limit of a Cr content of the steel 1 is 0.10%. However, if the Cr content of the steel 1 is too high, Cr carbides are formed, and the carbides do not easily dissolve during heating in hot stamping. Therefore, austenitizing the steel 1 hardly proceeds, and the hardenability deteriorates. Therefore, an upper limit of the Cr content of the steel 1 is preferably set to 0.50%.

"Mo: 0% to 0.50%"

Molybdenum (Mo) is an element that enhances hardenability of the steel 1. When this effect is obtained, a preferable lower limit of a Mo content of the steel 1 is 0.05%. However, if the Mo content of the steel 1 is too high, the above-described effect is saturated. Therefore, an upper limit of the Mo content of the steel 1 is preferably set to 0.50%.

[Nb: 0 to 0.10%, V: 0 to 0.10%, Ti: 0 to 0.10%]

Since Nb, V, and Ti contribute to improvement in strength of a steel sheet due to precipitation of carbides, one selected from these may be contained alone or in combination of two or more as necessary. However, if any of the elements is contained excessively, a large amount of carbide is generated to deteriorate toughness of the steel sheet. Therefore, amounts of these elements may each be set to 0.10% or less. If necessary, the amounts of these elements may each be set to 0.08% or less, 0.05% or less, or 0.03% or less.

"B: 0% to 0.0050%"

Boron (B) is an element that enhances hardenability of a steel, thereby enhancing a strength of the Zn-plated hot stamped product 100. When this effect is obtained, a preferable lower limit of a B content of the steel 1 is 0.0001%. However, if the B content of the steel 1 is too high, the effect is saturated. Therefore, an upper limit of the B content of the steel 1 is preferably set to 0.0050%.

[Ca: 0 to 0.0100%, REM: 0 to 0.0100%]

Ca and REM are elements that improve workability by controlling a form of a non-metallic inclusion that serves as a starting point for fracture and causes deterioration in workability, and thus may be contained as necessary. However, if amounts of these elements are excessive, the effect will be saturated and the raw material costs will increase. Therefore, each of the Ca content and the REM content is preferably set to 0.0100% or less. If necessary, the amounts of these elements may each be set to 0.0060% or less, 0.0040% or less, or 0.0030% or less. REM is a generic name for a total of 17 elements of Sc, Y, and lanthanoids, and the REM content refers to a total amount of the above-described elements.

The chemical composition of the steel 1 described above may be measured by a general analysis method. For example, it may be measured using inductively coupled plasma-atomic emission spectrometry (ICP-AFS). Further, C and S may be measured using a combustion-infrared absorption method, and N may be measured using an inert gas fusion-thermal conductivity method. A chemical composition on the surface may be analyzed after removing it by mechanical grinding.

(Zn-Based Plating Layer)

The Zn-based plating layer 2 of the Zn-plated hot stamped product 100 according to the present embodiment includes the lower layer 21 and the upper layer 22. The upper layer 22, which is a region of the Zn-based plating layer 2 on the surface layer side, has a two-phase structure in which the Fe—Zn solid solution 15 is distributed in the capital gamma phase (Γ phase) 14 in an island shape. The lower layer 21, which is a region of the Zn-based plating layer 2 on the steel side, has a single-phase structure of the Fe—Zn solid solution. A crystal structure of the Fe—Zn solid solution is the same as that of α-Fe. The Fe—Zn solid solution contains Fe and Zn dissolved in Fe. The Γ phase 14 is a metal phase mainly composed of $Fe_3Zn_{10}$ which is a metal compound of Fe and Zn. When the upper layer 22 on the surface layer side is made into the two-phase structure of the Γ phase 14 and the Fe—Zn solid solution 15, corrosion resistance after coating is improved.

In the Zn-plated hot stamped product 100, a thickness of the upper layer 22 and a thickness of the lower layer 21 of the Zn-based plating layer 2 satisfy the following expression (1).

$$0.20 \leq \text{upper layer thickness}/(\text{upper layer thickness}+\text{lower layer thickness}) \leq 0.80 \quad (1)$$

When the upper layer 22 and the lower layer 21 of the Zn-based plating layer 2 satisfy the above-described expression, corrosion resistance of the Zn-plated hot stamped product 100 and its plating adhesion to the steel can be secured.

If the "upper layer thickness/(upper layer thickness+lower layer thickness)" is smaller than 0.20, a proportion of the Γ phase 14 in the Zn-based plating layer 2 is reduced, and sufficient corrosion resistance may not be obtained. Also, if the "upper layer thickness/(upper layer thickness+lower layer thickness)" is larger than 0.80, adhesion between the lower layer 21 and the steel 3 may be deteriorated, and sufficient plating adhesion may not be obtained.

A proportion of the Γ phase 14 in the two-phase structure of the Γ phase 14 and the Fe—Zn solid solution 15 of the upper layer 22 of the Zn-based plating layer 2 (a proportion of the Γ phase with respect to the Γ phase 14 and the Fe—Zn solid solution 15 inside the upper layer 22) is preferably 20% or more and 80% or less. When the proportion of the Γ phase with respect to the Γ phase 14 and the Fe—Zn solid solution 15 inside the upper layer 22 is set to be 20% or more and 80% or less, plating adhesion between the lower layer 21 and the upper layer 22 (durability against fracture in the Zn-based plating layer 2) can be improved. When the proportion of the Γ phase with respect to the Γ phase 14 and the Fe—Zn solid solution 15 inside the upper layer 22 is less than 20%, corrosion resistance after coating may deteriorate. Also, when the proportion of the Γ phase with respect to the Γ phase 14 and the Fe—Zn solid solution 15 inside the upper layer 22 is more than 80%, the proportion of the hard and brittle Γ phase increases, and thereby workability of the upper layer 22 deteriorates. Thereby, adhesion between the upper layer 22 and the lower layer 21 may deteriorate, and the plating adhesion may deteriorate. If necessary, a lower limit of the "upper layer thickness/(upper layer thickness+lower layer thickness)" may be set to 25%, 30%, or 35%, and an upper limit thereof may be 75%, 70%, or 65%.

Figure 4:
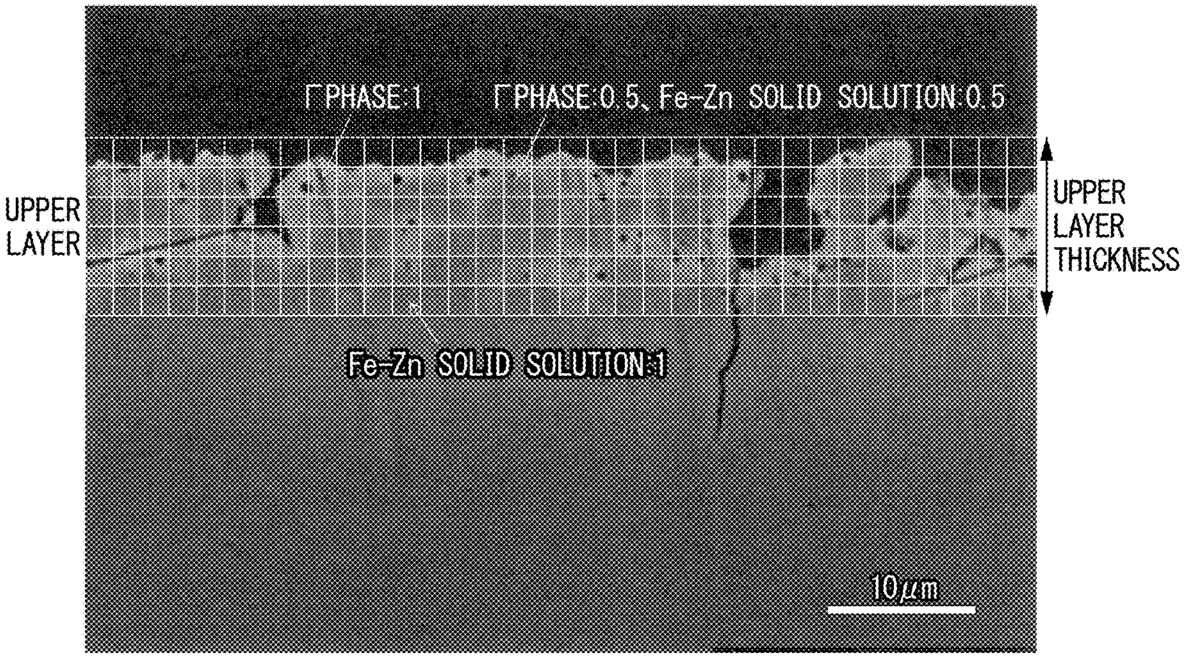
FIG. 4 is a view showing a state in which the upper layer in the cross-sectional SEM image of the Zn-plated hot stamped product according to the present embodiment is divided into squares with a pitch of 1 μmx 1 μm.

Regarding the proportion of the Γ phase 14 inside the upper layer 22, the SEM image when the thickness of the upper layer 22 is measured may be divided into squares with a pitch of 1 μm×1 μm as shown in FIG. 4 and divided into three types of the Γ phase only, the Fe—Zn solid solution only, and both the Γ phase and the Fe—Zn solid solution, the number of squares in each of the Γ phase and the Fe—Zn solid solution may be counted, and the proportion of the Γ phase may be calculated from the proportions of the squares. Further, for a square including both the Γ phase and the Fe—Zn solid solution, the square with the pitch of 1 μm×1 μm may be further subdivided to measure an area fraction more accurately, but 0.5 square may be allocated to each of the Γ phase and the Fe—Zn solid solution.

Further, in the present embodiment, the Zn-based plating layer 2 has a Zn content of 30.0% cc more by mass %. If necessary, a lower limit of the Zn content may be set to 35.0%, 40.0%, or 50.0%. An upper limit of the Zn content is preferably set to 80.0%. If necessary, the upper limit of the Zn content may be set to 78.0% or 75.0%. Although it is not particularly necessary to define amounts of elements other than Zn, a chemical composition of the Zn-based plating layer 2 (however, excluding Zn) is preferably, by mass %, for example, 20.0 to 70.0% of Fe, 0 to 1.0% of Al, 0 to 1.0% of Si, 0 to 1.0% of Mg, 0 to 1.0% of Mn, 0 to 1.0% of Ni, 0 to 1.0% of Sb, and a balance of impurities.

The Zn-based plating layer 2 according to the present embodiment has an Fe content in a range of 95.0% or less, and an analysis position of the chemical composition of the Zn-based plating layer 2 is a center of the thickness of the Zn-based plating layer 2 (a center of the film thickness). An analysis method of the chemical composition is as follows. Measurement of the Fe content is performed in a thickness direction of the Zn-plated hot stamped product 100 from the surface of the Zn-plated hot stamped product 100 (that is, a direction from the surface of the Zn-plated hot stamped product 100 toward a center of the sheet thickness) by glow-discharge optical emission spectroscopy (GDS), and a range until the Fe content exceeds 95.0% from the surface of the Zn-plated hot stamped product 100 is determined. Thereafter, an amount of each element at a center (that is, a center of the thickness of the Zn-based plating layer 2) of a distance of the range (this range is the Zn-based plating layer 2) from a position at which the Fe content has become 95.0% for the first time to the surface is analyzed by GDS, and the analytical value is used as the chemical composition of the Zn-based plating layer 2. Since there is the oxide layer further on the surface side of the Zn-plated hot stamped product 100, a position at which the Zn content is 80.0% (a position closest to the surface if there are a plurality of positions) is regarded as a surface position of the Zn-based plating layer 2. Even if the Zn content of the Zn-based plating layer 2 is about 30%, since Zn is incrassated in the oxide layer, the position at which the Zn content is 80% is defined as a boundary between the Zn-based plating layer 2 and the oxide layer 3.

However, if the region at which the Zn content is more than 80.0% is not in the outermost surface layer of the hot stamped product, the outermost surface layer is regarded as a surface position of the Zn-based plating layer 2 to determine a center of the thickness of the Zn-based plating layer 2 (a center of the film thickness).

Observation of the Γ phase 14 and the Fe—Zn solid solutions 12 and 15 can be performed as follows. After a sample cut into about 20 mm square is embedded in a resin so that the Zn-based plating layer 2 can be observed from the cross section, a mirror finishing is performed by mechanical polishing. Using a scanning electron microscope (SEM), this resin-embedded sample is observed with a backscattered electron (BSE) image and a secondary electron image at a magnification of 2000 times. In the SEM-BSE observation, since elements with a large atomic weight are observed with a bright (white) contrast, the Γ phase, the Fe—Zn solid solution, and the steel can be distinguished from each other by a difference in the contrast. Specifically, the Γ phase containing a large amount of Zn, which has a larger atomic weight than Fe, is observed in white, the Fe—Zn solid solution is observed in black, and the steel is observed in darker black. As can be seen from the backscattered electron images with different contrasts in FIGS. 2(*a*) and 2(*b*), the Γ phase 14, the Fe—Zn solid solutions 12 and 15, and the steel 1 can be easily distinguished by the difference in the contrast of the backscattered electron images. Also, as described above, when the Γ phase 14, the Fe—Zn solid solutions 12 and 15, and the steel 1 are observed by a difference in contrast of the SEM-BSE observation (that is, backscattered electron image), oxides containing a large number of tight elements are black and cannot be distinguished from the surrounding resin. Therefore, when the same field of view as the SEM-BSE observation is observed with SEM-SE (that is, observing as a secondary electron image such as FIG. 2(*c*)), the oxide layer formed on the surface layer side of the plating layer can be observed.

Further, the plating layer of the present embodiment has a two-layer structure, the lower layer 21 in contact with the steel 1 has a single-phase structure of the Fe—Zn solid solution 12, and the upper layer 22 has a two-phase structure of the Γ phase 14 and the Fe—Zn solid solution 15. A method of distinguishing between the upper layer 22 and the lower layer 21 will be described using an example in which the upper layer 22 has a two-phase structure of the Γ phase 14 and the Fe—Zn solid solution 15.

Figure 3:
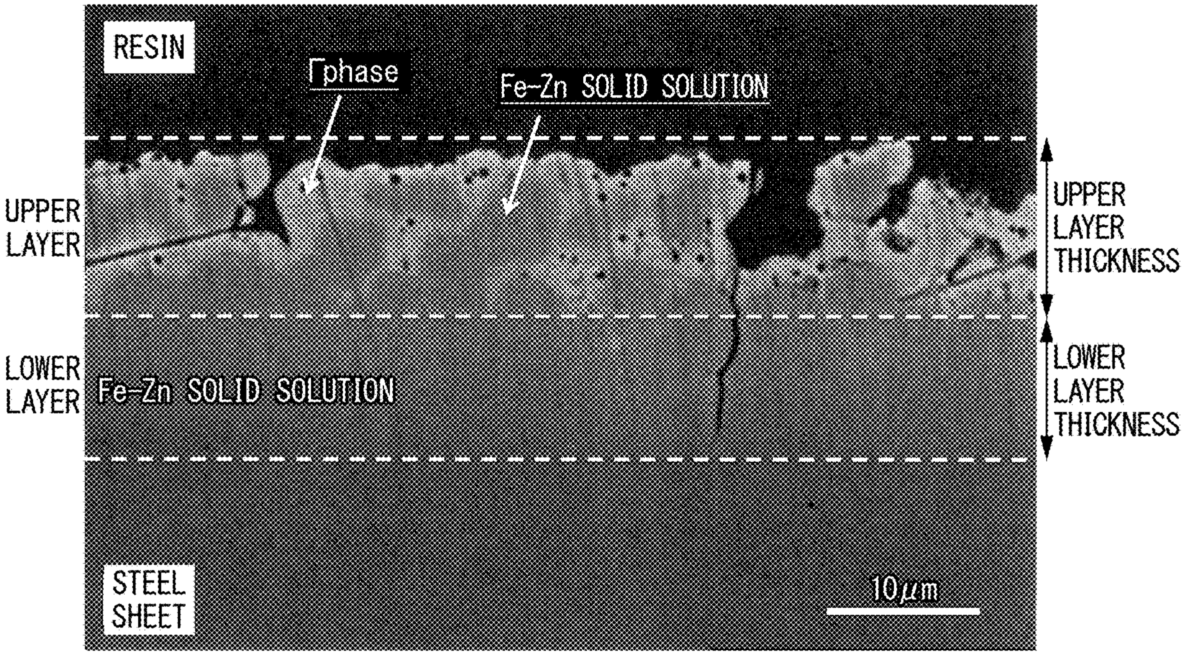
FIG. 3 is a view showing a boundary between an upper layer and a lower layer in a cross-sectional SEM image of the Zn-plated hot stamped product according to the present embodiment by a broken line.

As shown in FIG. 3, a virtual line drawn in a direction perpendicular to a thickness direction of the steel 1 (that is, in a direction parallel to the surface) at a position closest to the steel 1 in the thickness direction in the Γ phase 14 that is observed in white is defined as a boundary line between the upper layer 22 and the lower layer 21. The thickness of the upper layer 22 is a shortest distance from a position (that is, this corresponds to a position of the Zn-based plating layer 2 that is farthest from the steel 1 in the thickness direction) of the outermost layer of the upper layer 22 to the above-described boundary line. The thickness of the lower layer 21 is a shortest distance from the boundary line to a position (that is, this corresponds to a position of the Zn-based plating layer 2 that is farthest from the surface layer side in the thickness direction) on an interface between the Zn-based plating layer 2 and the steel 1 closest to a center of the steel side. This operation is performed in arbitrary five fields of view, the upper layer thicknesses and the lower layer thicknesses are measured, and average values thereof are taken as the upper layer thickness and the lower layer thickness.

(Oxide Layer)

The Zn-plated hot stamped product 100 according to the present embodiment includes the oxide layer 3 containing Zn and Mn. An Mn content average value Ave. Mn on the surface of the oxide layer 3 (surface of the hot stamped product 100) is 0.5 to 7.5% by mass %. That is, Ave. Mn satisfies the following expression (2) by mass %. Ave. Mn of the oxide layer 3 is more preferably 1.0% or more. Mn in the oxide layer 3 is one that has diffused from the steel 1 to the surface of the oxide layer 3 during hot stamping. Ave. Mn of the oxide layer 3 is preferably 7.0% or less. Ave. Mn of the oxide layer 3 is more preferably 6.5% or less. If Ave. Mn of the oxide layer 3 is 0.5% or more and 7.0% or less, generation of the hexagonal pattern can be suppressed.

$$\text{Ave. Mn}=0.5\text{ to }7.5 \qquad (2)$$

The Mn content ratio of Max. Mn/Min. Mn, which is a ratio of the maximum value Max. Mn to the minimum value Min. Mn of the Mn content on the surface (surface of the oxide layer 3) of the Zn-plated hot stamped product 100, is 10.0 or less. That is, Max. Mn/Min. Mn satisfies the following expression (3). If the Mn content ratio is 10.0 or less, the hexagonal pattern after hot stamping can be reduced, and an excellent quality of appearance can be obtained. The Mn content ratio is more preferably 8.0 or less. The Mn content ratio is still more preferably 5.0 or less. A lower limit of the Mn content ratio is 1.0. If necessary, the lower limit may be set to 1.2, 1.3, or 1.5.

$$\text{Max. Mn/Min. Mn}\leq 10.0 \qquad (3)$$

The Mn content of the oxide layer in the Zn-plated hot stamped product 100 can be measured by the following method. Using an electron beam microanalyzer (for example, EPMA-1720H manufactured by Shimadzu Corporation), a surface of the Zn-plated hot stamped product 100 is observed. At this time, an acceleration voltage is 15 kV, a beam current is 100 nA, and a beam diameter is set to a minimum condition (1 to 4 μm, however) of the equipment. The Mn content is measured on the surface of the Zn-plated hot stamped product 100 under conditions of a measurement length of 40 mm, a measurement pitch of 20 μm (measurements at 2000 points), and a measurement time of 1.0 sec/point. In order to eliminate an influence of roughness or the like of the surface layer, 10 adjacent points (by 200 μm=by 0.2 mm) in a measurement range are averaged as one region to be used as the Mn content of the region. The Mn content ratio (Max. Mn/Min. Mn) is calculated using a maximum value of the measured value of the Mn content (each Mn content of the 200 regions) as Max. Mn and a minimum measured value thereof as Min. Mn. An average value of the measured values of the Mn content is defined as Ave. Mn.

Further, if the hot stamped product has been coated with a coating such as a resin, the Mn content of the oxide is measured by the method described above after the coating is dissolved and removed using a remover. In that time, it is necessary to select a peeling condition according to a type and thickness of the coating to minimize coating residues and not to remove the oxide on the surface layer.

Figure 2:
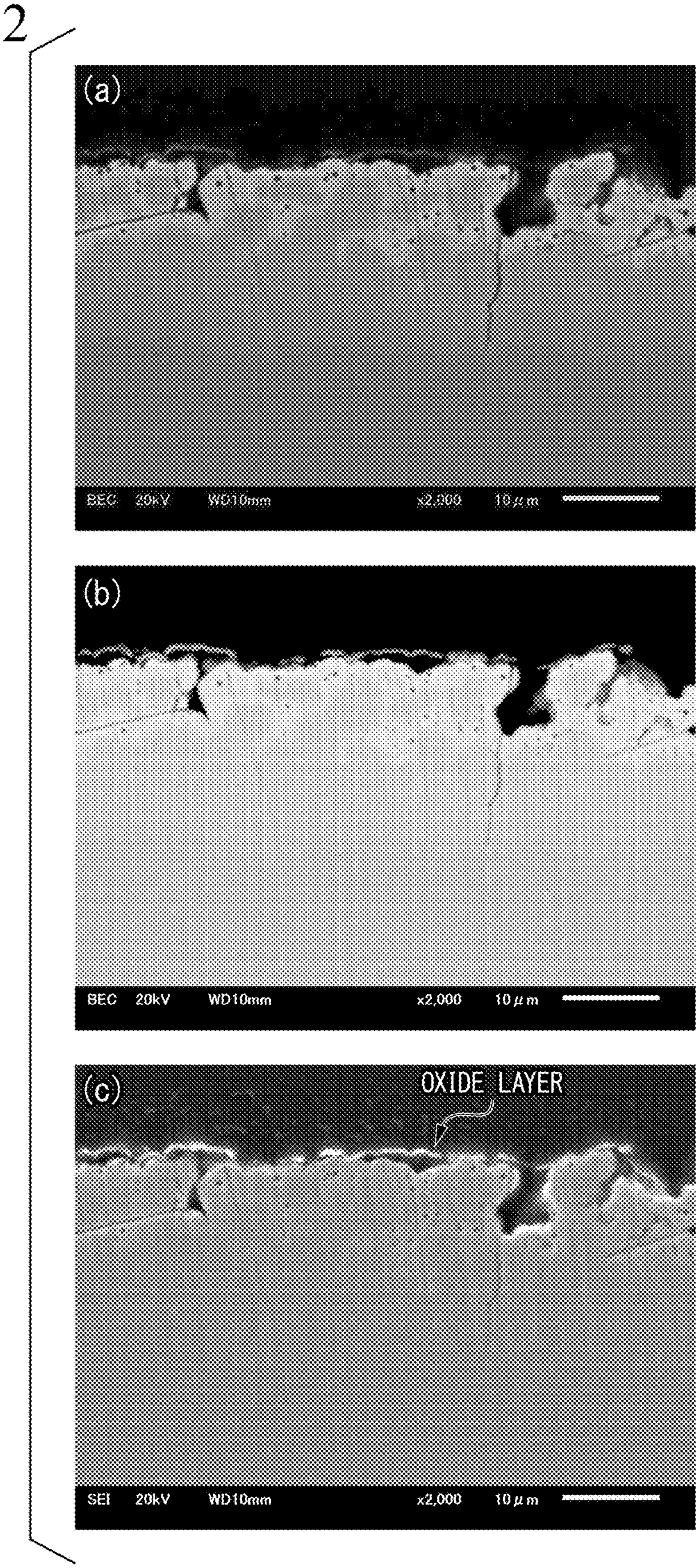
FIG. 2 shows backscattered electron images ((a) and (b); a contrast is different between (a) and (b)), and a secondary electron image (c) of the Zn-plated hot stamped product according to the present embodiment.

Further, in the present embodiment, the oxide layer 3 containing Zn and Mn is present on the surface of the Zn-plated hot stamped product 100. As shown in FIG. 2(*c*), presence of the oxide layer 3 can be ascertained from the secondary electron image obtained by SEM-SE observation. Since ascertaining types of the oxide contained in the oxide layer 3 is very complicated and a level of technical difficulty is high, the ascertaining is not necessary. When it is ascertained that the Mn content (Max. Mn, Min. Mn and Ave. Mn) on the surface of the hot stamped product 100 as described above satisfies expressions (2) and (3), the oxide layer 3 is regarded as being present.

(Sheet Thickness)

A sheet thickness of the hot stamped product 100 used for automobile members is often 1.0 to 3.2 mm. Therefore, the sheet thickness of the hot stamped product 100 is preferably set to 1.0 to 3.2 mm. Also, the sheet thickness may be set to 1.0 to 2.6 mm as necessary.

(Manufacturing Method)

Next, a manufacturing method of the Zn-plated hot stamped product 100 will be described. The manufacturing method of the Zn-plated hot stamped product 100 according to the present embodiment is not limited to the following method.

(Slab Heating Temperature: 1100 to 1300° C.)

First, a steel is prepared. For example, a molten steel having a chemical composition within the preferable range described above is manufactured. Using the manufactured molten steel, a slab is manufactured by a casting method such as continuous casting. A heating temperature of the slab is preferably 1100° C. or higher. There is no particular upper limit determined for heating of the slab. In order to heat the slab at a temperature higher than 1300° C., a large amount of energy input is required, and this causes a significant increase in manufacturing costs. From this, a heating temperature of the slab is preferably 1300° C. or lower.

Hot rolling after heating the slab, cooling after the hot rolling, and winding may be performed by a general method, and are not particularly limited.

After winding the steel, annealing after winding is performed as necessary. After the winding or after the annealing after winding, the hot-rolled steel sheet is subjected to a known pickling treatment. After the pickling treatment, cold rolling may be performed as necessary. A known method may be used according to characteristics required for a member to be applied.

(Zn-Based Plating)

When Zn-based plating is performed on the hot-rolled steel sheet or the cold-rolled steel sheet described above, a Zn-based plating layer is formed on a surface of the steel sheet, and a steel for hot stamping is obtained. A method of forming the Zn-based plating layer is not particularly limited, but formation of the Zn-based plating is preferably performed by a hot-dip galvanizing treatment.

A plating weight of the Zn-based plating layer of the steel for hot stamping is preferably 80 $g/m^2$ or more and 150 $g/m^2$ or less. If the plating weight of the Zn-based plating layer is 80 $g/m^2$ or more, it is desirable because an effect of improving corrosion resistance of the hot stamped product can be obtained, and if the plating weight thereof is 150 $g/m^2$ or Less, it is preferable because a satisfactory appearance can be obtained after the plating treatment (if the plating weight is more than 150 $g/m^2$, in a case in which hot-dip galvanizing has been performed, the plating may drip, resulting in a poor appearance, and thereby an appearance of the hot stamped product may also deteriorate). Further, the Zn-based plating layer of the steel for hot stamping is a hot-dip galvanized steel sheet (GI) with a small amount of oxides in the formed product when it is hot stamped. A galvannealed steel sheet (GA) is not suitable as the Zn-based plating layer of the present invention because it produces a large amount of oxides in the formed product when it is hot stamped and an appearance thereof is poor. Therefore, as the steel for hot stamping, which is a material of the hot stamped product 100, the galvannealed steel sheet (GA) is not preferable, and the hot-dip galvanized steel sheet (GI) is preferable. Even if the hot stamped product 100 is manufactured using the galvannealed steel sheet (GA), Ave. Mn=0.5 to 7.5 cannot be satisfied, and as a result, the goal of obtaining a satisfactory appearance cannot be met.

The plating weight of the Zn-based plating layer of the steel for hot stamping can be obtained by immersing the Zn-based plating layer in a 5% of HCl aqueous solution containing 0.02% of an inhibitor (IBIT 700A, Asahi Chemical Co., Ltd.) that suppresses dissolution of Fe in the above-described hot-rolled steel sheet or cold-rolled steel sheet for 10 minutes at room temperature to dissolve the entire Zn-based plating layer, and calculating a change in weight before and after the dissolution. However, whether or not the dissolution of the Zn-based plating layer is completed is determined on the basis of completion of bubbling caused by hydrogen generation during the dissolution.

A chemical composition of the Zn-based plating layer of the steel for hot stamping can be, for example, by mass %, 0.1% to 1.0% of Al, 0.1% to 20.0% of Fe, 0% to 0.5% of Si, 0% to 0.5% of Mg, 0% to 0.5% of Mn, 0% to 0.5% of Pb, 0% to 0.5% of Sb, and a balance of Zn and impurities. A Zn content in the balance is preferably 80% or more.

After the Zn-based plating layer is formed, a surface roughness Ra (μm) of the steel for hot stamping and a sheet thickness t (mm) of the steel for hot stamping are preferably adjusted by temper rolling so that the following expression (4) is satisfied. A person skilled in the art can adjust Ra/t within a range of the following expression (4) by controlling the surface roughness Ra (μm) and an elongation rate of the temper rolling roll. For example, Ra/t can be adjusted to the range of the following expression (4) by temper rolling at an elongation rate of about 1.5% with a temper rolling roll having Ra≤2.5 μm.

$$0.05 \leq Ra/t \leq 0.25 \tag{4}$$

If a value of Ra/t is larger than 0.25, the quality of appearance may deteriorate due to formation of the hexagonal pattern. Also, if the value of Raft is less than 0.05, a thickness of the Fe—Zn solid solution 15 of the lower layer 21 may increase, and a thickness ratio between the upper layer 22 and the lower layer 21 may not be obtained. Further, it is more preferable that Ra be 0.3 μm or less.

(Hot Stamping Process)

Hot stamping is performed on the steel for hot stamping that includes the above-described Zn-based plating layer. Details are described below.

In order to make a ratio between the thickness of the lower layer 21 and the thickness of the upper layer 22 of the Zn-based plating layer 2, in a hot stamping process, the steel for hot stamping is heated so that an Fe—Zn solid solution parameter P defined by the following expression (5) satisfies 0.5≤P≤2.5.

$$P=[(T-782)\times\{(t_2-t_1)/2+(t-t_2)\}]/W^2 \tag{5}$$

Here, T denotes a furnace temperature setting temperature (heating temperature) (° C.), t denotes a time (heating time) (sec) from when the steel sheet is inserted into a heating furnace to when it is taken out, $t_1$ denotes a time (sec) for a temperature of the steel sheet to reach 782° C., $t_2$ denotes a time to reach a heating temperature (T)−10° C. (a time to reach T−10° C.) (sec), and W denotes a plating weight ($g/m^2$).

If a P value is less than 0.5, plating adhesion may deteriorate without becoming a state in which an interface of the Zn-based plating layer 2 on the steel side is covered by the lower layer 21 made of the Fe—Zn solid solution. The P value for avoiding such a state is 0.5 or more.

If the P value is more than 2.5, a proportion of the Fe—Zn solid solution in the Zn-based plating layer 2 increases, and corrosion resistance after coating deteriorates. Therefore, the P value is 2.5 or less.

Hardening cannot be performed when the heating temperature T is lower than $Ac_3$. Therefore, the heating temperature is preferably the $Ac_3$ point or higher. When the heating temperature is 950° C. or higher, surface oxidation (formation of Zn oxides) of the Zn-plated hot stamped product 100 proceeds excessively, and the Mn content ratio exceeds 10.0. Therefore, the heating temperature T is preferably lower than 950° C. Further, the $Ac_3$ point (° C.) is represented by the following expression (6).

$$Ac_3=912-230.5\times C+31.6\times Si-20.4\times Mn-14.8\times Cr-18.1\times Ni+16.8\times Mo-39.8\times Cu \quad (6)$$

Further, element symbols in the above expression are each an amount of the element by mass %, and 0 is substituted when the element is not contained.

If the heating time is less than 240 seconds, hardening may not be possible. Therefore, the heating time is preferably 240 seconds or longer. If the heating time is longer than 600 seconds, the surface oxidation (formation of Zn oxides) of the Zn-plated hot stamped product 100 may proceed excessively. Therefore, the heating time is preferably 600 seconds or shorter.

In hot stamping, usually, a steel for hot stamping is pressed using a die in which a cooling medium (for example, water) is circulated inside. When the steel for hot stamping is pressed, the steel for hot stamping is hardened by removing heat from the die. With the processes described above, the Zn-plated hot stamped product 100 is manufactured.

With the upper layer having a two-phase structure of the Γ phase and the Fe—Zn solid solution, and the lower layer having a single-phase of the Fe—Zn solid solution, in order to obtain the Zn-based plating layer 2 in which "upper layer thickness/(upper layer thickness+lower layer thickness)" is within a range of 0.20 to 0.80, a temperature (quenching start temperature) at which the steel for hot stamping is started to be pressed is set to a temperature equal to or lower than a lower limit (about 750° C.) of a temperature at which liquid phase Zn contained in the Zn-based plating layer completely solidifies, and higher than an upper limit of a temperature range at which a single layer of the Γ phase is formed. For a specific temperature range, a temperature range that forms the above-described structure can be easily obtained by conducting for example, a preliminary test in advance or the like. Quenching, that is, hot stamping processing, can be started from the temperature range obtained in this way.

If an average cooling rate from the quenching start temperature to 450° C. is lower than 20° C./s, a sufficient strength cannot be obtained. Therefore, the average cooling rate from the quenching start temperature to 450° C. is 20° C./s or faster.

Also, an average cooling rate from 450° C. to 200° C. is preferably 15° C./s or faster.

Example

Next, an example of the present invention will be described, but the condition in the example is one condition example employed for ascertaining feasibility and effects of the present invention, and the present invention is not limited to the one condition example. The present invention can employ various conditions as long as the objective of the present invention is achieved without departing from the gist of the present invention.

A slab obtained by casting a molten steel having a chemical composition of 0.20% of C, 0.19% of Si, 1.31% of Mn, 0.010% of P, 0.005% of S, 0.01% of Cu, 0.01% of Ni, 0.20% of Cr, 0.01% of Mo, 0.01% of Ti, 0.0002% of B, 0.002% of N, 0.0002% of Ca, 0.0002% of REM, 0.020% of Al, and a balance being iron and impurities ($Ac_3$: 842° C.) was heated, subjected to hot rolling, and then wound. Thereafter, the obtained steel was pickled to obtain a hot-rolled steel.

The above-described hot-rolled steel sheet was subjected to cold rolling to the thicknesses shown in Table 1, annealed, subjected to Zn-based plating (hot-dip galvanizing) under the conditions shown in Table 1, and a part of the hot-dip galvanized steel sheets (No. 17 and 18) were subjected to an alloying treatment, thereby obtaining plated steel sheets.

The obtained plated steel sheets were subjected to temper rolling to have the Ra shown in Table 1 to obtain steels for hot stamping.

The steels for hot stamping obtained by the above-described method were subjected to hot stamping under the conditions shown in Table 1, and thereby Zn-plated hot stamped products were obtained. The P value for each condition is shown in Table 1.

(Plating Weight of Zn-Based Plating Layer)

A plating weight of the Zn-based plating layer of the steel for hot stamping was measured as follows. A sample (30 mm×30 mm) cut out from the steel for hot stamping obtained above was coated with a masking tape on an evaluation surface and the opposite surface, and then was immersed in a 5% of HCl aqueous solution containing 0.02% of an inhibitor (IBIT 700A, Asahi Chemical Co., Ltd.) that suppresses dissolution of Fe in the hot-rolled steel sheet for 10 minutes at room temperature to dissolve the entire Zn-based plating layer, thereby calculating a change in weight before and after the dissolution. Whether or not the dissolution of the entire plating layer is completed is determined on the basis of completion of bubbling caused by hydrogen generation during the dissolution. The obtained results are shown in Table 1.

(Upper Layer Thickness and Lower Layer Thickness)

A cross section of the Zn-based plating layer was observed at a magnification of 2000 times using a sample that had been embedded in a resin and then polished so that the cross section of the Zn-based plating layer of the Zn-plated hot stamped product can be observed. A virtual line drawn perpendicularly to a thickness direction of the steel at a position closest to the steel in a region containing the Γ phase observed in white was defined as a boundary between the upper layer and the lower layer. The upper layer thickness was defined as a shortest distance from an outermost layer of the upper layer to the virtual line. The lower layer thickness was defined as a shortest distance from the boundary between the upper layer and the lower layer to a position on an interface between the Zn-based plating layer and the steel closest to the steel side. For each sample, five fields of view were arbitrarily observed, the upper layer thicknesses and the lower layer thicknesses were measured, and average values were taken as the upper layer thickness and the lower layer thickness. The results are shown in Table 2.

(Proportion of Γ Phase)

Regarding a proportion of the Γ phase inside the upper layer of the Zn-based plating layer of the Zn-plated hot stamped product, the SEM image when the above-described upper layer thickness was measured was divided into squares with a pitch of 1 μm×1 μm and divided into three types of the Γ phase only, the Fe—Zn solid solution only, and both the Γ phase and the Fe—Zn solid solution, the number of squares in each of the F phase and the Fe—Zn solid solution was counted, and the proportion of the Γ phase was calculated from the proportions of the squares. Further, for a square including both the Γ phase and the Fe—Zn solid solution, 0.5 square was allocated to each of the Γ phase and the Fe—Zn solid solution. The results are shown in Table 2.

(Mn Content)

Using an electron beam microanalyzer (EPMA-172011 manufactured by Shimadzu Corporation), a surface of the Zn-plated hot stamped product was measured with an acceleration voltage of 15 kV, a beam current of 100 nA, and a beam diameter of 4 μm which was a minimum condition of the equipment under conditions of a measurement length of 40 mm, a measurement pitch of 20 μm (measurements at 2000 points), and a measurement time of 1.0 sec/point. In order to eliminate an influence of roughness or the like of the surface layer, 10 adjacent points (by 200 μm=by 0.2 mm) in a measurement range were averaged as one region to be used as the Mn content of the region. The Mn content ratio (Max. Mn/Min. Mn) was calculated using a maximum value of the measured value of the Mn content (each Mn content of the 200 regions) as Max. Mn and a minimum measured value thereof as Min. Mn, and an average value of the measured values of the Mn content was defined as Ave. Mn. The obtained results are shown in Table 2.

Further, as a result of analyzing the chemical compositions of the Zn-based plating layer 2 using the above-described GDS method, the chemical compositions of the Zn-based plating layer 2 by mass % were within ranges of 30 to 80% of Zn, 20.0 to 70.0% of Fe, 0 to 1.0% of Al, 0 to 1.0% of Si, 0 to 1.0% of Mg, 0 to 1.0% of Mn, 0 to 1.0% of Ni, and 0 to 1.0% of Sb.

(Corrosion Resistance after Coating)

An evaluation of corrosion resistance after coating was performed by the following method. A Zn-plated hot stamped product (plate shape) was subjected to surface modification at room temperature for 20 seconds using a surface modification treatment agent (trade name: PREPALENE-X) manufactured by Nihon Parkerizing Co., Ltd. Next, phosphating was performed using a zinc phosphate treatment agent (trade name: PALBOND 3020) manufactured by Nihon Parkerizing Co., Ltd. Specifically, a temperature of the treatment agent was set to 43° C., and the Zn-plated hot stamped product was immersed in the treatment agent for 120 seconds. As a result, a phosphate coating film was formed on the surface of the steel.

After the above-described phosphating treatment was performed, a cationic electrodeposition paint manufactured by Nippon Paint Holdings Co., Ltd. was applied to the plate-shaped hot pressed steel (formed product) of each test number for electrodeposition coating by a slope energization at a voltage of 160 V and was further baking-finished at a baking temperature of 170° C. for 20 minutes. Film thickness control of the paint after the electrodeposition coating was performed under a condition that the electrodeposition coating was 15 μm on the plated steel sheet before hot stamping.

A composite corrosion test (neutral salt water spray cycle test specified in JIS H 8502 (1999)) was performed on a steel sheet (formed product) after the electrodeposition coating by making a cross-cut to reach the base steel. Specifically, a corrosion evaluation test was conducted with one cycle of salt water spray (35° C., 2 h), drying (60° C., 25% RH, 4 h), and moistening (50° C., 98% RH, 2 h). Further, a 5% saline solution was used for the salt water spray. Corrosion resistance was evaluated by a width of paint blister, a width of paint blister of 3 mm or less after 180 cycles of the composite corrosion test was evaluated as "OK," and a width of paint blister of more than 3 mm was evaluated as "NG." The results are shown in Table 2.

(Plating Adhesion)

An evaluation of resistance to chipping (evaluation of plating adhesion) was performed by the following method. A piece of 70 mm×150 mm was cut out and subjected to degreasing, chemical conversion, and 3-coat coating for automobiles. The 3-coat coating includes electrodeposition coating, intermediate coating, and top coating performed from the steel sheet side. Crushed stones (0.3 to 0.5 g) were perpendicularly applied at an air pressure of 2 kgf/cm$^2$ in a state of being cooled and held at −20° C. Ten stones were applied per sample. Chipping marks were observed and positions of peeled interfaces were evaluated. One having the peeled interface above the plating layer (an interface between plating and chemical conversion film, or an interface between electrodeposition coating and intermediate coating) was evaluated as "OK," and one having peeling inside the plating and one having at least one peeled interface between the plating and the base metal were evaluated as "NG." The results are shown in Table 2.

(Quality of Appearance)

The hexagonal pattern evaluation (evaluation of the quality of appearance) was performed by the following method. For a hot stamping material made into a size of 100 mm×100 mm, one in which linear unevenness was not visually ascertained on the surface was evaluated as "OK," and one in which at least one linear unevenness was ascertained thereon was evaluated as "NG." The results are shown in Table 2.

TABLE 1

| | Steel sheet | | | | | | |
|---|---|---|---|---|---|---|---|
| No. | Types of plating | [W] plating weight [g/m$^2$] | Al concentration in plating [mass %] | Fe concentration in plating [mass %] | Sheet thickness (t) [mm] | Surface roughness (Ra) [μm] | Ra/t |
| 1 | GI | 80 | 0.3 | 0.5 | 2.0 | 0.2 | 0.10 |
| 2 | GI | 80 | 0.3 | 0.5 | 2.0 | 0.2 | 0.10 |
| 3 | GI | 80 | 0.3 | 0.5 | 2.0 | 0.2 | 0.10 |
| 4 | GI | 80 | 0.3 | 0.5 | 2.0 | 0.2 | 0.10 |
| 5 | GI | 80 | 0.3 | 0.5 | 2.0 | 0.2 | 0.10 |
| 6 | GI | 80 | 0.3 | 0.5 | 2.0 | 0.2 | 0.10 |
| 7 | GI | 80 | 0.3 | 0.5 | 3.2 | 0.2 | 0.06 |
| 8 | GI | 80 | 0.3 | 0.5 | 2.0 | 0.2 | 0.10 |
| 9 | GI | 80 | 0.3 | 0.5 | 0.8 | 0.3 | 0.38 |
| 10 | GI | 80 | 0.3 | 0.5 | 1.6 | 0.3 | 0.19 |
| 11 | GI | 80 | 0.3 | 0.5 | 1.8 | 0.5 | 0.28 |
| 12 | GI | 80 | 0.3 | 0.5 | 2.0 | 0.2 | 0.10 |
| 13 | GI | 80 | 0.3 | 0.5 | 2.0 | 0.2 | 0.10 |
| 14 | GI | 80 | 0.3 | 0.5 | 2.0 | 0.2 | 0.10 |

TABLE 1-continued

| | | | | | | | |
|---|---|---|---|---|---|---|---|
| 15 | GI | 120 | 0.2 | 0.4 | 2.0 | 0.2 | 0.10 |
| 16 | GI | 120 | 0.3 | 0.4 | 2.0 | 0.2 | 0.10 |
| 17 | GA | 80 | 0.3 | 14.5 | 2.0 | 1.2 | 0.60 |
| 18 | GA | 80 | 0.3 | 14.5 | 2.0 | 0.4 | 0.20 |

| | Manufacturing conditions | | | | | | | |
|---|---|---|---|---|---|---|---|---|
| No. | [T] Heating temperature [° C.] | [T] Heating time [sec] | Forming start temperature [° C.] | [$t_1$] 782° C. reaching time [sec] | [$t_2$] Heating temperature (T) −10° C. reaching time [sec] | P: Fe—Zn solid solution parameter | | Remarks |
| 1 | 830 | 420 | 700 | 330 | 400 | 0.4 | NG | Comparative example |
| 2 | 845 | 420 | 700 | 310 | 400 | 0.6 | OK | Example |
| 3 | 860 | 390 | 700 | 280 | 360 | 0.9 | OK | Example |
| 4 | 875 | 360 | 700 | 260 | 355 | 0.8 | OK | Example |
| 5 | 890 | 360 | 700 | 240 | 350 | 1.1 | OK | Example |
| 6 | 925 | 360 | 700 | 210 | 305 | 2.3 | OK | Example |
| 7 | 925 | 420 | 700 | 290 | 385 | 1.8 | OK | Example |
| 8 | 950 | 360 | 700 | 180 | 290 | 3.3 | NG | Comparative example |
| 9 | 920 | 360 | 700 | 160 | 270 | 3.1 | NG | Comparative example |
| 10 | 860 | 390 | 700 | 240 | 300 | 1.5 | OK | Example |
| 11 | 890 | 300 | 700 | 200 | 290 | 0.9 | OK | Comparative example |
| 12 | 860 | 600 | 700 | 280 | 360 | 3.4 | NG | Comparative example |
| 13 | 860 | 390 | 750 | 280 | 360 | 0.9 | OK | Example |
| 14 | 860 | 390 | 600 | 280 | 360 | 0.9 | OK | Example |
| 15 | 860 | 480 | 700 | 300 | 380 | 0.8 | OK | Example |
| 16 | 860 | 600 | 700 | 300 | 380 | 1.4 | OK | Example |
| 17 | 890 | 390 | 700 | 120 | 210 | 3.8 | NG | Comparative example |
| 18 | 860 | 390 | 700 | 250 | 330 | 1.2 | OK | Comparative example |

TABLE 2

| | Plating structure (hot stamped product) | | | | |
|---|---|---|---|---|---|
| No. | Upper layer thickness [μm] | Lower layer thickness [μm] | Upper layer thickness/(upper layer thickness + lower layer thickness) | Proportion of Γ phase in upper layer [%] | Mn content on surface (hot stamped product) Average (Ave. Mn) |
| 1 | 18.2 | 3.2 | 0.85 | 85 | 1.1 |
| 2 | 16.9 | 5.0 | 0.77 | 65 | 1.8 |
| 3 | 14.9 | 7.3 | 0.67 | 55 | 2.0 |
| 4 | 13.7 | 8.9 | 0.61 | 40 | 1.3 |
| 5 | 14.3 | 9.2 | 0.61 | 30 | 3.2 |
| 6 | 5.4 | 15.2 | 0.26 | 25 | 7.2 |
| 7 | 8.9 | 12.6 | 0.41 | 30 | 5.9 |
| 8 | 3.2 | 16.9 | 0.16 | 5 | 8.9 |
| 9 | 3.5 | 14.8 | 0.19 | 10 | 9.5 |
| 10 | 12.7 | 9.8 | 0.56 | 40 | 6.9 |
| 11 | 15.5 | 6.9 | 0.69 | 50 | 7.0 |
| 12 | 2.1 | 17.3 | 0.11 | 15 | 11.7 |
| 13 | 14.6 | 7.5 | 0.66 | 60 | 1.9 |
| 14 | 15.3 | 7.1 | 0.68 | 50 | 2.2 |
| 15 | 20.8 | 12.5 | 0.62 | 55 | 3.5 |
| 16 | 12.3 | 19.1 | 0.39 | 45 | 7.2 |
| 17 | 2.3 | 16.9 | 0.12 | 10 | 12.3 |
| 18 | 12.8 | 11.5 | 0.53 | 35 | 15.3 |

TABLE 2-continued

| No. | Mn content on surface (hot stamped product) Maximum (Max. Mn) | Minimum (Min. Mn) | Mn Content ratio (Max. Mn/Min. Mn) | Performance evaluation Corrosion resistance after coating | Plating adhesion | Quality of appearance | Remarks |
|---|---|---|---|---|---|---|---|
| 1 | 2.2 | 0.7 | 3.1 | OK | NG | OK | Comparative example |
| 2 | 2.5 | 0.6 | 4.2 | OK | OK | OK | Example |
| 3 | 4.2 | 1.2 | 3.5 | OK | OK | OK | Example |
| 4 | 3.3 | 0.8 | 4.1 | OK | OK | OK | Example |
| 5 | 6.4 | 1.8 | 3.6 | OK | OK | OK | Example |
| 6 | 8.5 | 2.9 | 2.9 | OK | OK | OK | Example |
| 7 | 9.3 | 2.0 | 4.7 | OK | OK | OK | Example |
| 8 | 25.3 | 1.2 | 21.1 | NG | OK | NG | Comparative example |
| 9 | 20.3 | 0.8 | 25.4 | NG | OK | NG | Comparative example |
| 10 | 9.5 | 2.7 | 3.5 | OK | OK | OK | Example |
| 11 | 28.9 | 0.6 | 48.2 | OK | OK | NG | Comparative example |
| 12 | 18.6 | 4.0 | 4.7 | NG | OK | OK | Comparative example |
| 13 | 4.1 | 1.3 | 3.2 | OK | OK | OK | Example |
| 14 | 4.3 | 0.6 | 7.2 | OK | OK | OK | Example |
| 15 | 6.7 | 2.1 | 3.2 | OK | OK | OK | Example |
| 16 | 9.4 | 3.1 | 3.0 | OK | OK | OK | Example |
| 17 | 23.4 | 1.5 | 15.6 | NG | OK | NG | Comparative example |
| 18 | 31.2 | 5.2 | 6.0 | OK | OK | NG | Comparative example |

Underlined one indicates that it is outside the range of the present invention

No. 2 to 7, No. 10, and No. 13 to 16 that satisfy the requirements of the present invention were excellent in the corrosion resistance after coating, the plating adhesion, and the quality of appearance.

The Zn-plated hot stamped product of No. 1 did not satisfy the requirement for the ratio between the upper layer and the lower layer and thus was inferior in plating adhesion.

The Zn-plated hot stamped products of No. 8 and 9 did not satisfy the ratio between the upper layer and the lower layer and the Mn content ratio, and thus were inferior in the corrosion resistance after coating and the quality of appearance.

The Zn-plated hot stamped product of No. 11 did not satisfy the Mn content ratio and thus was inferior in the quality of appearance.

The Zn-plated hot stamped product of No. 12 did not satisfy the ratio between the upper layer and the lower layer and thus was inferior in the corrosion resistance after coating.

The Zn-plated hot stamped product of No. 17 did not satisfy the ratio between the upper layer and the lower layer, and thus the corrosion resistance after coating was low. In addition, since the galvannealed steel sheet (GA) was used, the quality of appearance was inferior.

The Zn-plated hot stamped product of No. 18 used the galvannealed steel sheet (GA), and thus was inferior in the quality of appearance.

INDUSTRIAL APPLICABILITY

The Zn-plated hot stamped product of the present invention is excellent in corrosion resistance after coating, plating adhesion, and appearance, and therefore industrial applicability is high.

BRIEF DESCRIPTION OF THE REFERENCE SYMBOLS

1 Steel
2 Zn-based plating layer
3 Oxide layer
14 Γ phase
12, 15 Fe—Zn solid solution
21 Lower layer
22 Upper layer
100 Hot stamped product

The invention claimed is:

1. A Zn-plated hot stamped product comprising:

a steel;

a Zn-based plating layer containing Zn formed on a surface of the steel; and an oxide layer containing Zn and Mn formed on a surface of the Zn-based plating layer, wherein the Zn-based plating layer includes a lower layer and an upper layer, wherein the upper layer is a region on the surface side of the Zn-based plating layer which has a two-phase structure in which a Fe—Zn solid solution is distributed in the Γ phase, and the lower layer is a region of the Zn-based plating layer on the steel side excluding the upper layer which has a single-phase structure of the Fe—Zn solid solution, an upper layer thickness and a lower layer thickness satisfy the following expression (1), and a maximum value Max. Mn, a minimum value Min. Mn, and an average value Ave. Mn of an Mn content by mass % on a surface of the Zn-plated hot stamped product satisfy the following expressions (2) and (3), $$0.20 \leq \text{upper layer thickness}/(\text{upper layer thickness}+\text{lower layer thickness}) \leq 0.80 \quad (1)$$

$$\text{Ave. Mn}=0.5 \text{ to } 7.5 \quad (2)$$

$$\text{Max. Mn}/\text{Min. Mn} \leq 10.0 \quad (3).$$

2. The Zn-plated hot stamped product according to claim 1, wherein a proportion of the Γ phase in the two-phase structure of the Γ phase and the Fe—Zn solid solution of the upper layer is 20 to 80%.

3. The Zn-plated hot stamped product according to claim 1, wherein a Zn content of the Zn-based plating layer is 30.0% or more by mass %.

4. The Zn-plated hot stamped product according to claim 1, wherein a sheet thickness is 1.0 to 3.2 mm.

5. The Zn-plated hot stamped product according to claim 2, wherein a Zn content of the Zn-based plating layer is 30.0% or more by mass %.

6. The Zn-plated hot stamped product according to claim 2, wherein a sheet thickness is 1.0 to 3.2 mm.

7. The Zn-plated hot stamped product according to claim 3, wherein a sheet thickness is 1.0 to 3.2 mm.

8. The Zn-plated hot stamped product according to claim 5, wherein a sheet thickness is 1.0 to 3.2 mm.

* * * * *